US012802899B2

(12) United States Patent
Solase et al.

(10) Patent No.: US 12,802,899 B2
(45) Date of Patent: Nov. 17, 2026

(54) ACTUATING MECHANISM FOR A DEVICE

(71) Applicant: Eaton Intelligent Power Limited, Dublin (IE)

(72) Inventors: Rushikesh Solase, Maharashtra (IN); Vishal Pawar, Pune (IN); Minal Waghmore, Ichalkaranji (IN); Kaushik Kona, Pune (IN); Mangesh Pingle, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 364 days.

(21) Appl. No.: 18/600,079

(22) Filed: Mar. 8, 2024

(65) Prior Publication Data

US 2024/0312731 A1 Sep. 19, 2024

(30) Foreign Application Priority Data

Mar. 14, 2023 (IN) ............................ 202311016937
May 2, 2023 (GB) ..................................... 2306481

(51) Int. Cl.
*H01H 3/40* (2006.01)
*H01H 1/14* (2006.01)
*H01H 3/38* (2006.01)

(52) U.S. Cl.
CPC ................ *H01H 3/40* (2013.01); *H01H 1/14* (2013.01); *H01H 3/38* (2013.01)

(58) Field of Classification Search
CPC .. H01H 3/40; H01H 1/14; H01H 3/38; H01H 3/42; H01H 3/46; H01H 9/20; H01H 33/666; H01H 9/24
See application file for complete search history.

(56) References Cited

U.S. PATENT DOCUMENTS 6,815,623 B1 * 11/2004 Holland .................. H01H 9/26 200/50.33
6,872,900 B1 * 3/2005 Lament .................... H01H 9/26 200/50.32

(Continued)

FOREIGN PATENT DOCUMENTS

EP 1529299 B1 2/2007
JP S6240509 A 2/1987

(Continued)

*Primary Examiner* — Lheiren Mae A Caroc
(74) *Attorney, Agent, or Firm* — LEYDIG, VOIT & MAYER, LTD.

(57) ABSTRACT

A switching device including a plurality of switching mechanisms configured to connect and disconnect a power supply from a load, the switching mechanisms arranged along a first axis and each including a fixed contact and a moveable contact, and an actuating mechanism for simultaneously actuating the plurality of switching mechanisms. The actuating mechanism includes a bridge configured to move the movable contacts of the plurality of switching mechanisms, a shaft arranged along a rotational axis parallel to the first axis, wherein the shaft is configured to rotate around the rotational axis, and one or more force transmittal mechanisms configured to convert torque from the rotation of the shaft to a linear force acting on the bridge in a second direction. The second direction is perpendicular to the first axis. Movement of the bridge in the second direction brings the moveable contacts into electrical contact with the fixed contacts.

16 Claims, 11 Drawing Sheets

(56) References Cited

U.S. PATENT DOCUMENTS

| | | | | |
|---|---|---|---|---|
| 11,631,553 | B2 * | 4/2023 | Postmus | H01H 33/666 200/5 B |
| 2011/0155697 | A1 | 6/2011 | Lee | |
| 2023/0160416 | A1 | 5/2023 | Ogawa | |

FOREIGN PATENT DOCUMENTS

| | | | |
|---|---|---|---|
| JP | 2006049027 | A | 2/2006 |
| JP | 4346880 | B2 | 10/2009 |
| WO | 2022044063 | A1 | 3/2022 |

* cited by examiner

Position 1

Position 2

ACTUATING MECHANISM FOR A DEVICE

CROSS-REFERENCE TO RELATED APPLICATIONS

This application claims priority pursuant to 35 U.S.C. 119 (a) to Indian Application No. 202311016937, filed Mar. 14, 2023, which application is incorporated herein by reference in its entirety. This application claims priority pursuant to 35 U.S.C. 119 (a) to British Application No. 2306481.9, filed May 2, 2023, which application is incorporated herein by reference in its entirety.

FIELD

The present application relates to an actuating mechanism for a device. In particular, the present application relates to a switching device having multiple switching mechanisms, where the actuating mechanism and switching mechanisms are arranged in a depth-wise orientation. In some specific example implementations, the device is a vacuum circuit breaker or VCB.

BACKGROUND

Switchgears and other switching devices are used to control and protect electrical equipment, such as equipment operated by utilities, commercial building owners, and operators of distributed renewable generation assets such as solar farms and wind turbines. Such switchgears include various medium voltage devices (e.g., devices rated for 12 kV or 24 kV) for a range of applications, such as a ring main unit (RMU). Other switching devices include, for example, vacuum circuit breakers (VCBs).

For any given equipment specification or application, it is desirable to provide a reliable and compact device with a small footprint. It is also desirable to provide an actuating mechanism with a small footprint.

SUMMARY

The matter for protection is set out in the appended claims.

Disclosed herein is a switching device comprising: a plurality of switching mechanisms configured to connect and disconnect a power supply from a load, the plurality of switching mechanisms arranged along a first axis and each comprising a fixed contact and a moveable contact; and an actuating mechanism for simultaneously actuating the plurality of switching mechanisms. The actuating mechanism comprises: a bridge configured to move the movable contacts of the plurality of switching mechanisms; a shaft arranged along a rotational axis parallel to the first axis, wherein the shaft is configured to rotate around the rotational axis; and one or more force transmittal mechanisms configured to convert torque from the rotation of the shaft to a linear force acting on the bridge in a second direction. The second direction is perpendicular to the first axis. Movement of the bridge in the second direction in response to the linear force brings the moveable contacts into electrical contact with the fixed contacts to close the switching mechanisms and connect the power supply to the load.

In some implementations, for each switching mechanism, the moving contact is arranged between the shaft and the fixed contact along the second direction. Optionally, the one or more force transmittal mechanisms are arranged between the shaft and the fixed contact along the second direction. Optionally, the one or more force transmittal mechanisms are coupled to the shaft.

In some implementations, each switching mechanism comprises a vacuum interrupter. Optionally, the switching device is a vacuum circuit breaker.

In some examples, the one or more force transmittal mechanisms comprise: a secondary shaft configured to rotate around a third axis perpendicular to both the first axis and the second direction; a four-bar linkage configured to apply the linear force to move the bridge in the second direction in response to rotation of the secondary shaft; and a coupling configured to rotate the secondary shaft in response to rotation of the shaft so as to transfer the torque from the rotation of the shaft to drive the four-bar linkage.

Optionally, the coupling comprises a bevel gear pair. Optionally, the bevel gear pair is a 1:1 bevel gear pair. In some examples, the coupling further comprises a spur gear pair, wherein the bevel gear pair and the spur gear pair are rotationally connected by a shaft extending parallel to the third axis. Optionally, the spur gear pair is a 1:1 spur gear pair. This arrangement can facilitate provision of a more compact device.

In some examples, the shaft and the secondary shaft overlap but are offset along the second direction. Optionally, wherein the shaft comprises an offset portion which extends parallel to the rotational axis of the shaft but is offset from the rotational axis. Optionally, the device further comprises a resiliently deformable member coupled to the offset portion of the shaft, wherein rotation of the shaft around the rotational axis in response to user input causes deformation of the resiliently deformable member, and wherein a restoring force due to deformation of the deformed resiliently deformable member causes further rotation of the shaft around the rotational axis independent of the user input. Optionally, the resiliently deformable member is a tension spring. This offset and resiliently deformable member can facilitate provision of a toggle point, allowing user independent actuation of the device beyond the toggle point. Quicker actuating of the device may therefore be facilitated.

Optionally, the one or more force transmittal mechanisms comprise one or more cams arranged on the shaft and one or more corresponding cam followers arranged on the bridge. The cam and cam follower arrangement can facilitate reliable actuation of the switching mechanism via the shaft of the actuating mechanism whilst allowing the overall actuating mechanism to be more compact by aligning the shaft with the rest of the actuating mechanism and the switching mechanisms.

In some examples the device further comprises a latch configured to retain the actuating mechanism when the switching mechanism is closed, wherein the latch is engageable by a user to release the actuating mechanism and open the switching mechanism. The latch can engage to retain the actuating mechanism and prevent further rotation of the shaft, thereby keeping the switching mechanism closed until released by a user. Accidental opening of the device may therefore be prevented.

Also disclosed herein is a switchgear, comprising a plurality of switching devices as discussed above, wherein each switching device comprises a plurality of poles, and wherein each pole is associated with a respective switching mechanism of the switching device.

In some examples, one or more earthing or disconnection switches can also be provided. For example, the switching device described herein can further comprise a plurality of disconnector and earthing switches, each disconnector and earthing switch associated with a respective switching mechanism. Each disconnector and earthing switch can comprise a disconnector blade having a first end and a second end, wherein the disconnector blade is configured to pivot around the first end between three different positions, the three positions comprising: a first position in which the disconnector and earthing switch is closed and the power supply is connected to the load through the disconnector blade; a second, isolation, position in which the disconnector and earthing switch is open and the power supply is disconnected from the load; and a third position in which the power supply is disconnected from the load and a second end of the disconnector blade is electrically connected to an earthing contact. Such a disconnector and earthing switch (also termed an earthing disconnection switch) can be termed a 3PS switch (three position disconnector and earthing switch).

It is desirable to provide a reliable and compact switchgear with a small footprint. It is also desirable to provide an earthing disconnection switch (also termed a disconnector and earthing switch) with three positions-on, off (or isolation), and earth—to facilitate in-situ testing of cable integrity and improve the ease of maintenance of the switchgear. It is particularly desirable to combine a three-position disconnector and earthing with a compact switchgear. Such a compact switchgear can be facilitated by the switching device comprising an actuating mechanism described herein.

LIST OF FIGURES

The following description is with reference to the Figures.

DETAILED DESCRIPTION

Figure 1A:
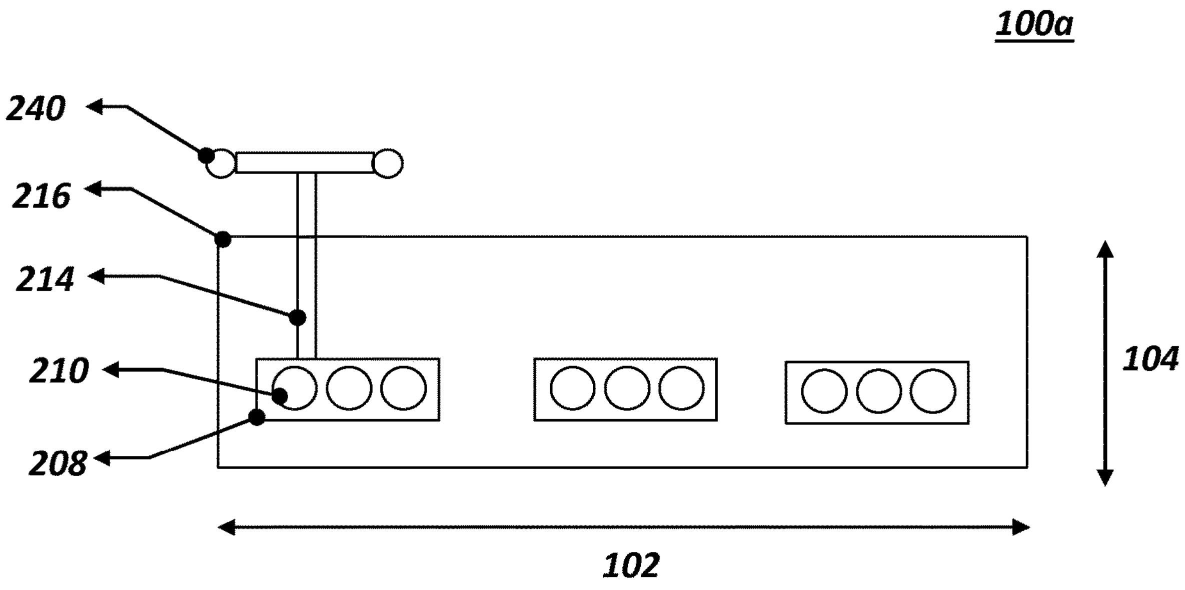
FIG. 1A shows a plan view of an existing switchgear architecture.

With reference to the schematic of FIG. 1A, an existing switchgear architecture is shown in plan (top down) view. This example switchgear 100*a* is a 3-way, 3-phase (or 3-pole) device, i.e., has three switching devices 208, each having three phases/poles 210. In some examples, each switching device has a two-position disconnection switch for the live and earth contacts, e.g. a switch having two positions (on, earth). The disconnection switch, or disconnector and earthing switch, is not shown.

Each switching device is arranged in a panel or housing 216 along a longitudinal direction 102 (or longitudinal axis 102), with the phases/poles (L1, L2, L3) for each switching device similarly arranged along the longitudinal direction. This arrangement is termed herein a "longitudinal" or "width wise" orientation. In one specific example of an existing switchgear, such a longitudinal/width wise architecture provides a width w (along the longitudinal direction 102) of 1100 mm, with a depth d (along a transverse direction 104 perpendicular to the longitudinal direction) of 600 mm. However, it will be understood that switchgears may have other dimensions and may include any suitable combination of switch types.

Figure 1B:
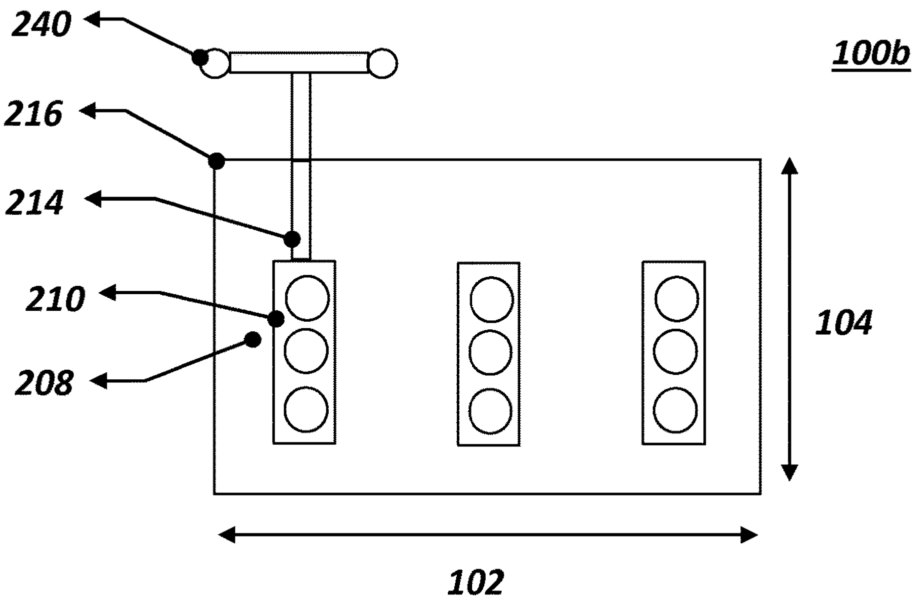
FIG. 1B shows a plan view of a depth-wise switchgear architecture as described herein.

With reference to the schematic of FIG. 1B, a new switchgear architecture in accordance with the present invention is shown in plan (top down) view. This example switchgear 100*b* is a 3-way, 3-phase (or 3-pole) device, i.e., has three switching devices 208, each having three phases/poles 210. In some examples, each switching device has a three-position earthing disconnection switch (or disconnector and earthing switch) having three positions (on, off or isolation, earth). In other examples, each switching device has a two-position disconnection switch, as per switchgear 100*a*. The disconnection switch, or disconnector and earthing switch, is not shown.

Each switching device 208 is arranged in a panel or housing 116 along a longitudinal direction 102, but the phases/poles 210 for each switching device 208 are arranged along the transverse direction 104 (the poles for each switch are arranged along a respective transverse axis 104). This arrangement is termed herein a "transverse" or "depth wise" orientation. In one specific example of the proposed switchgear, such a transverse/depth wise architecture provides a width w (along the longitudinal direction 102) of 900 mm, with a depth d (along a transverse direction 104 perpendicular to the longitudinal direction 102) of 780 mm. In another specific example, such a transverse/depth wise architecture provides a width w (along the longitudinal direction 102) of 700 mm, with a depth d (along the transverse direction 104 perpendicular to the longitudinal direction 102) of 750 mm. However, it will be understood that switchgears with this orientation may have other dimensions and may include any suitable combination of switch types. For example, any switchgear 100*b* may be provided with a plurality of switching devices 208, each switching device having a plurality of poles 210, arranged in accordance with the architecture of FIG. 1B.

In other words, the switchgear arrangement of FIG. 1B can be generally implemented for any switchgear comprising a plurality of switching devices 208 configured to disconnect a power supply from a load. By way of the novel switchgear architecture illustrated in FIG. 1B, the width of the switchgear product may be reduced, providing for a more compact switchgear whilst still allowing for e.g., provision of a three-position disconnection switch for the earthing contacts (three-position disconnector and earthing switch). However, there is a need to modify the actuating mechanism of the existing switchgear 100*a* to accommodate the depth wise orientation of the switchgear 100*b*. This will be described with reference to FIGS. 2A-2B.

Figure 2A:
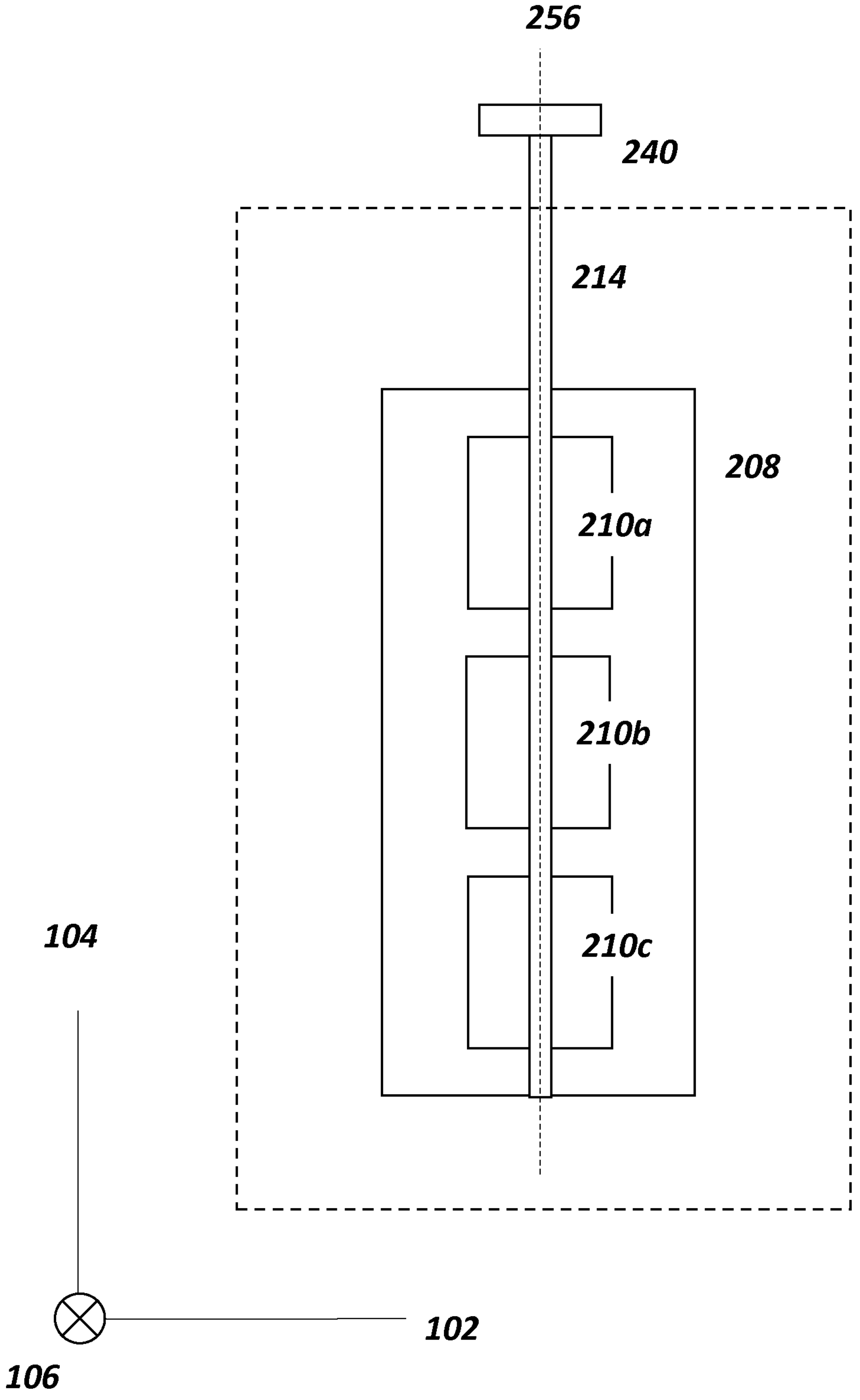
FIG. 2A shows a schematic plan view of an example switching device having a depth-wise architecture.
Figure 2B:
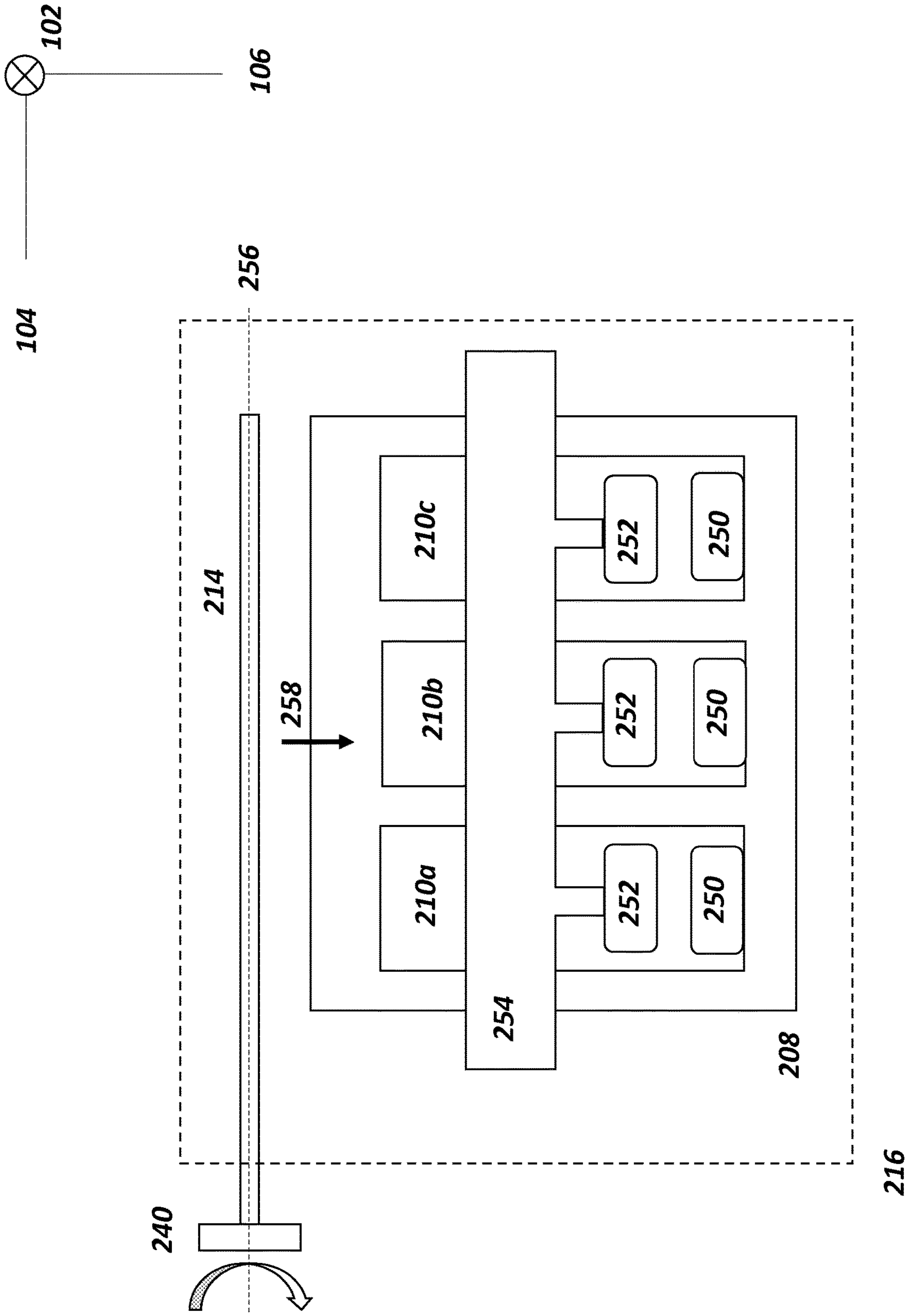
FIG. 2B shows a side view of the switching device of FIG. 2A.

With reference to FIGS. 2A-2B, a switching device 208 is described. FIG. 2A shows a plan view (from the top), and FIG. 2B shows a side view. In some particular examples, switching device 208 can be implemented as a vacuum circuit breaker, VCB. However, it will be understood that the switching device may be any other type of device, as required. For example, the device may be a load break switch.

Switching device 208 can optionally be enclosed within a housing 216. One or more switching devices 208 can be provided in combination to provide a switchgear 100*b* or other disconnection device of the desired size or capacity. The one or more switching devices 208 can be provided within a switching compartment of the housing 216 (illustrated by the dashed lines).

Switching device 208 comprises a plurality of switching mechanisms 210 configured to connect and disconnect a power supply from a load. Here there are three switching mechanisms (210*a*, 210*b*, 210*c*), but there may be two switching mechanisms or more than three, depending on the application of the switching device 108. In other words, any suitable number of switching mechanisms (of any suitable type, e.g., mechanical, electromechanical and/or solid state) may be used. The plurality of switching mechanisms are arranged along a first axis 104 (having the same orientation as the transverse axis of FIGS. 1A-1B). In other words, the switching mechanisms are placed in a depth wise orientation. Each switching mechanism 210 comprises a fixed contact 250 and a moveable contact 252.

An actuating mechanism is provided for simultaneously actuating the plurality of switching mechanisms. The actuating mechanism comprises a bridge 254 configured to move the movable contacts of the plurality of switching mechanism. The actuating mechanism comprises a shaft 214 arranged along a rotational axis 256. The rotational axis 256 is parallel to the first axis 104. The shaft is configured to rotate around the rotational axis 256. The shaft can be rotated or turned by way of handle 240, or through any suitable mechanism.

The actuating mechanism also comprises one or more force transmittal mechanisms configured to convert torque from the rotation of the shaft to a linear force acting on the bridge 254 in a second direction 258. The second direction is perpendicular to the first axis 104. Here, the second direction is shown as being parallel to axis 106. Movement of the bridge in the second direction 258 in response to the linear force brings the moveable contacts 252 into electrical contact with the fixed contacts 250 to close the switching mechanisms 210 and connect the power supply to the load. The bridge 254 can carry the moveable contacts 252 or can be otherwise configured to drive the moveable contacts into electrical contact the fixed contacts to close the switching device 108 (on position). The bridge 254 can also move the moveable contacts out of electrical contact with the fixed contacts to open the switching device (off position).

In this way, the actuating mechanism is arranged in a depth wise orientation, such that the alignment of the shaft is parallel to the alignment of the switching mechanisms 210 along the first axis 104. In this way, a more compact design can be provided which has a smaller dimension in the width wise or longitudinal direction (along axis 102). In other words, the depth wise alignment or orientation of the actuating mechanism can facilitate provision of a more compact switching device.

In some examples, a switchgear 100*b* is provided having the actuating mechanism described with reference to FIGS. 2A-2B. The switchgear comprises a plurality of switching devices according to any preceding claim. Each switching device comprises a plurality of poles, and each pole is associated with a respective switching mechanism 210 of the switching device 208. In other words, each switching device 208 comprises a plurality of poles, each pole associated with a respective switching mechanism 210 having a fixed contact and a moveable contact, and an actuating mechanism comprising a shaft 214. The shaft 214 is configured to rotate around a rotational axis to transfer an external input force provided via handle 240 to move the moveable contact 252 and open or close the switching mechanisms 210 of the respective switching device 208. The plurality of switching devices are arranged along a longitudinal axis (102) within the switchgear 100*b*. The plurality of poles of each switching device are arranged along the first axis (104) perpendicular to the longitudinal axis. Each shaft 214 is arranged along a rotational axis parallel to the first axis 104. A compact switchgear can therefore be provided by way of the depth wise actuating mechanism described herein.

With further reference to FIGS. 2A-2B, in some examples each switching mechanism can be arranged or orientated such that the moving contact 252 is arranged between the shaft 214 and the fixed contact 250 along the second direction. In other words, the fixed contact 250 is offset from the shaft along the axis 106, and the moving contact is disposed between the fixed contact and the shaft. In some examples, the one or more force transmittal mechanisms are arranged between the shaft and the fixed contact along the second direction. In other words, the moving parts of the actuating mechanism are arranged between the fixed contact and the shaft, each of which are fixed in space along the axis 106.

By providing a vertical offset (offset along the second direction 258), the width of the switching device 208 (in the longitudinal direction 102) may be reduced. In other words, the arrangement or orientation of the actuating mechanism and switching mechanism along the axis 106 or second direction can facilitate provision of a more compact switching device.

The switching mechanism can be implemented in any suitable manner or be of any suitable type, e.g., any suitable type of mechanical or electromechanical mechanism. The top contact of the switching mechanism is the moveable contact 252, moveable by the actuating mechanism is response to rotation of the shaft 214. The fixed contact of the switching mechanisms can be fixed to the housing 216, or can be fixed in any other suitable way.

In some particular examples, each switching mechanism 110 is implemented as, or comprises, a vacuum interrupter (or VI). In these examples, the bridge 254 is configured to drive the moving contact into electrical contact with the fixed contacts. For example, the bridge can be coupled to one or more drive pins or drive rods associated with the vacuum interrupter (such as drive rods 344 illustrated in FIG. 3A) such that movement of the bridge in the second direction 258 actuates the vacuum interrupter. The VI can be implemented as part of a VCB, or vacuum circuit breaker. In a VCB the operation of switching on and closing of current carrying contacts (e.g. the moving or moveable contact) and interrelated arc interruption takes place in a vacuum chamber in the breaker which is called a vacuum interrupter.

The top contact of the vacuum interrupter VI is the moveable contact 252, moveable by the actuating mechanism is response to rotation of the shaft 214. The fixed contact of the vacuum interrupter VI can be fixed to a bottom plate of the housing 216 via a support plate (not shown). A housing of the VI covers the fixed and moving contacts and is bolted to the support plate. Column supports formed of an insulating material (not shown) can be bolted between the support plate and the bottom plate to hold the support plate within the switching compartment of the housing 216. As discussed above, the moving contact moves within the VI housing in response to actuation/rotation of the shaft 214. In particular, rotation of the shaft 214 actuates the drive pin/rod coupled to the bridge 254 of the actuating mechanism, pushing the moveable contact in the second direction 258 away from the shaft 214 and opening the switching mechanism 210.

With particular reference to FIGS. 3A-3F, a first example implementation of the one or more force transmittal mechanisms configured to convert torque from the rotation of the shaft to a linear force acting on the bridge 254 in a second direction 258 (as discussed with reference to FIGS. 2A-2B) is now described. The bridge can be sandwiched between or otherwise at least partially enclosed within one or more plates 360.

In this example, the one or more force transmittal mechanisms comprise a four-bar linkage 330 configured to apply the linear force to move the bridge in the second direction 258. When the shaft 214 rotates, it forces the four-bar linkage 330 to move or pivot towards a left hand side of FIG. 3A: bars of the linkage consequently move from being at an angle (as shown in FIG. 3E) with respect to the horizontal to being perpendicular or almost perpendicular from the horizontal (as shown in FIG. 3F), thereby increasing the vertical component of the bar length. This increase in bar length in the vertical (i.e., along axis 106) forces the bridge 254 to move downwards (in the second direction 258). The amount of displacement, d, corresponds to the change in length of the vertical components of the bar length between the positions of FIGS. 3E and 3F. The movement of the four-bar linkage can be further facilitated by a resiliently deformable member 332 and cam 336, as will be understood by the skilled person, or by any other suitable components. The resiliently deformable member 332 is optionally an extension spring.

Such a linkage 330 can be the same as, or similar to, actuating mechanisms of existing switchgears 100*a*. In particular, the four-bar linkage is configured to apply the linear force to move the bridge in the second direction 258 in response to rotation of a shaft. In existing devices illustrated in FIG. 1A, the linkage can be directly driven by shaft 214 through rotation of handle 240. However, the change from a width wise orientation of the switching mechanisms 108 to a depth wise orientation (as in FIG. 1B) requires modification of existing actuating mechanisms.

In the implementation of FIGS. 3A-3F, the one or more force transmittal mechanisms comprise a secondary shaft 334 configured to rotate around a third axis perpendicular to both the first axis 102 and the second direction 258 (along axis 106). In other words, secondary shaft 334 is configured to rotate around the third axis 102 (aligned with the longitudinal direction 102 of FIGS. 1A-1B). The four-bar linkage 330 is configured to apply the linear force to move the bridge in the second direction in response to rotation of the secondary shaft 334. A coupling is configured to rotate the secondary shaft 334 in response to rotation of the shaft 214 so as to transfer the torque from the rotation of the shaft to drive the four-bar linkage 330.

Figure 3A:
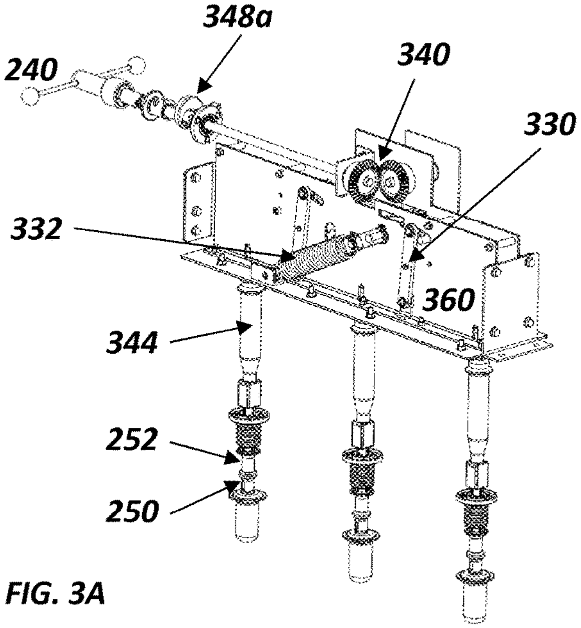
FIGS. 3A and 3B show perspective views of a first example switching device.
Figure 3B:
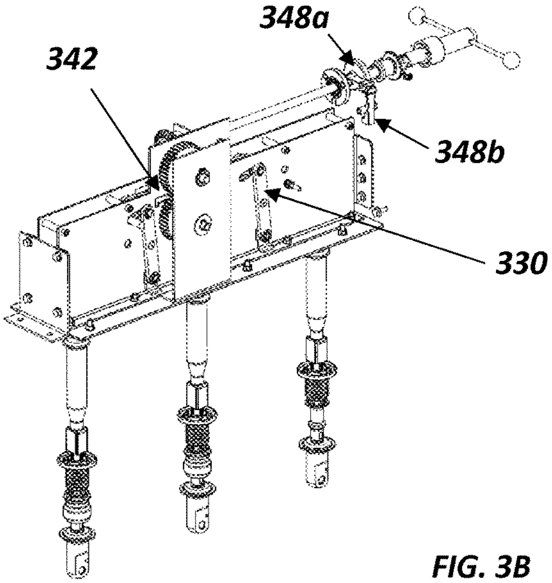
Figure 3C:
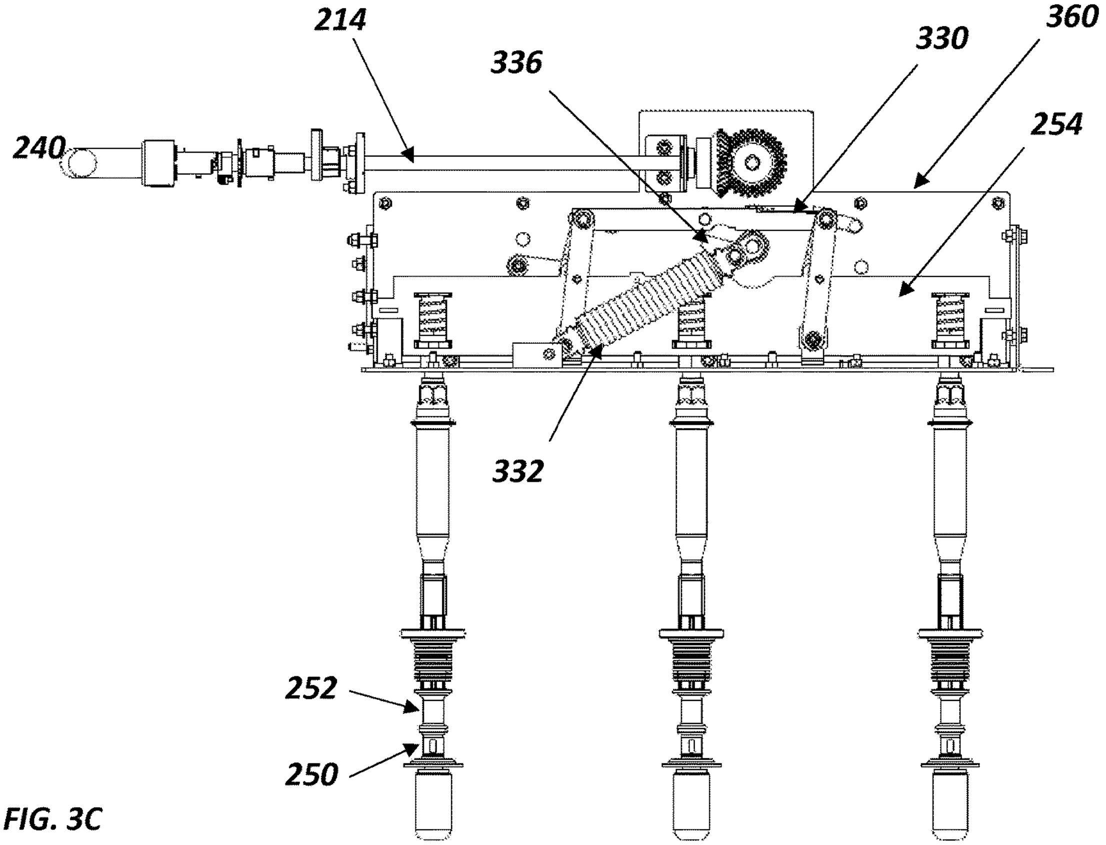
FIG. 3C shows a side view of the switching device of FIGS. 3A and 3B.
Figure 3D:
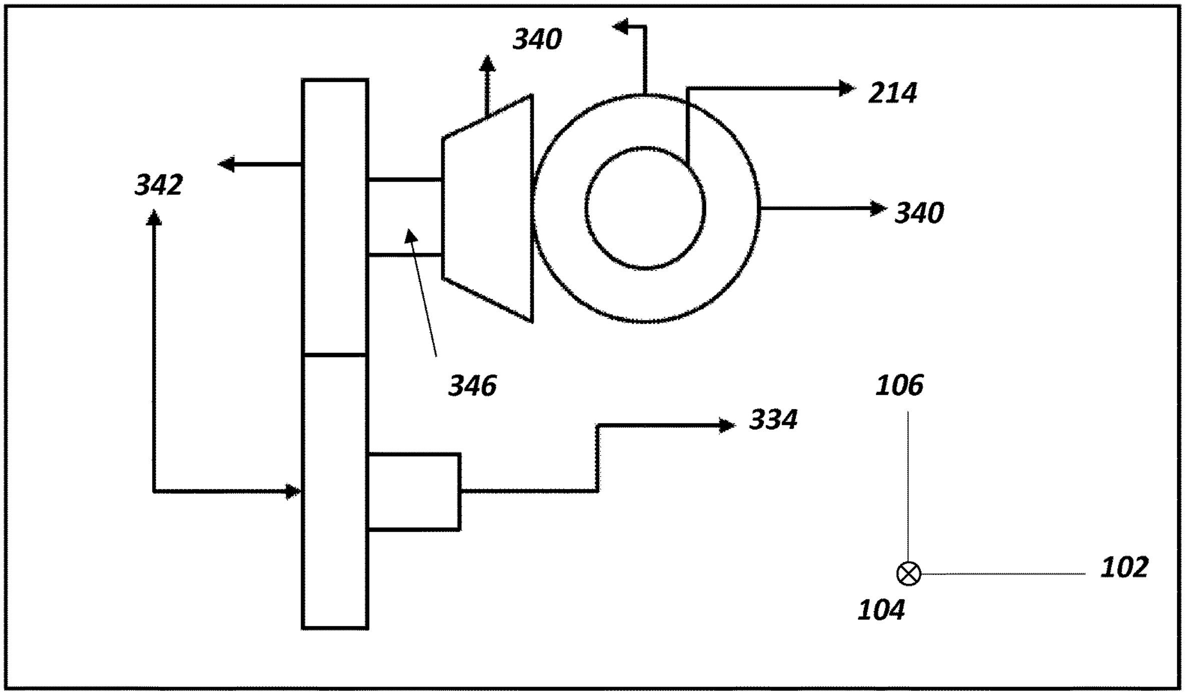
FIG. 3D is a schematic illustration of an aspect of the actuating mechanism of the first example switching device.
Figures 3E, 3F:
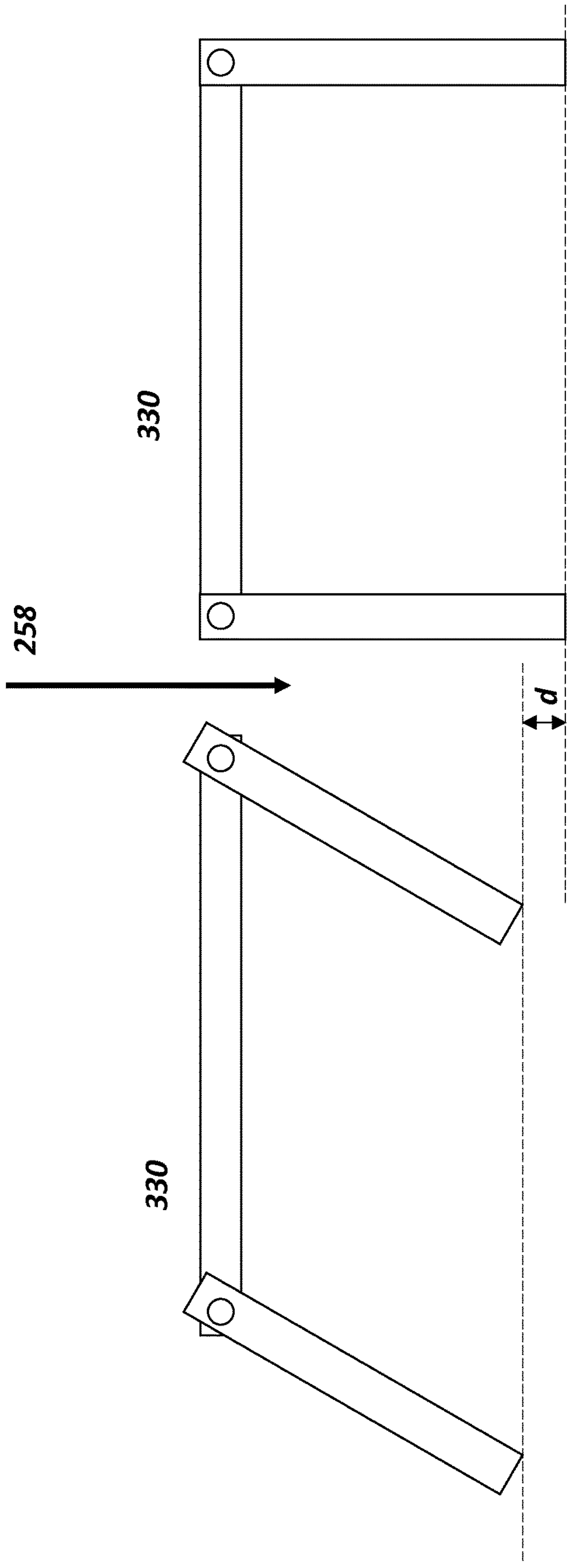
FIGS. 3E and 3F are schematic illustrations of another aspect of the actuating mechanism of the first example switching device.

FIG. 3A-3C show perspective and side on views of an example of the switching device 210 showing the linkage 330, and FIG. 3D shows a schematic of an example of the coupling. By providing a coupling in this way, a compact switching device 208 can be provided with only a small modification of existing actuating mechanisms. Consequently, the user interface (e.g., the handle 240 or other mechanism) and mode of operation can remain the same, reducing or eliminating the need for user/operator training.

With reference to FIGS. 3A-3F, the coupling of this particular implementation comprises a bevel gear pair 340. The bevel gear pair transfers the torque from rotation of the shaft 214 from the rotational axis (transverse direction) to the third axis 102 (longitudinal direction). This facilitates the change in orientation of the switching mechanisms relative to the actuating mechanism, i.e., allows the actuating mechanism to be aligned with the switching mechanisms. In some examples, the bevel gear pair is a 1:1 bevel gear pair, but any suitable gearing may be used. Bevel gears are most often used to transmit power at 90 degrees, or at a right angle. The axes of the two bevel gear shafts intersect and the tooth-bearing faces of the gears themselves are conically shaped. Bevel gears are most often mounted on shafts that are 90 degrees apart (here shafts 215, 346). However, any other suitable arrangement to transfer torque from one axis to another, perpendicular axis may be used instead of the bevel gear mechanism. For example, a spiral gear or worm gear may be used.

The coupling further comprises a spur gear pair 342, wherein the bevel gear pair 340 and the spur gear pair 342 are rotationally connected by a shaft 346 extending parallel to the third axis 102. In some examples the spur gear pair is a 1:1 spur gear pair, but any suitable gearing may be used. Any other suitable arrangement to offset torque along the axis 106 may be used instead of the spur gear mechanism. The use of the spur gears (or other mechanism) transfers the torque in a vertical direction (i.e., along the axis 106). By offsetting the shaft 214 and the shaft 334 in the vertical direction, the shafts 214, 334 can be placed under each other. This can facilitate provision of a more compact device. In other words, by arranging the shaft 214 and the secondary shaft 334 to overlap, but then offsetting the shafts in the second direction 258 (so that when viewed in a plan view they appear to intersect, but do not actually touch), a smaller and more compact switching device 108 can be provided.

In some implementations, the switching device further comprises a latch 348 configured to retain the actuating mechanism in a fixed position when the switching mechanism is closed. For example, as the actuating mechanism pushes the bridge in the second direction 258 and closes the switching mechanism 210, the latch 348 can engage to retain the actuating mechanism. In some examples, such as is illustrated with reference to FIGS. 3A and 3B, a latching portion 348*a* of the latch 348 is coupled to or otherwise arranged on shaft 214. An engagement portion 348*b* of the latch is configured to engage the latching portion to retain the actuating mechanism (i.e., to prevent the bridge from moving in a direction opposite the second direction 258) by preventing further rotation of the shaft 214. The engagement portion may be coupled to the housing 216 or may be arranged and/or fixed in any suitable manner to retain the actuating mechanism.

The latch 348 is further engageable by a user to release the actuating mechanism and open the switching mechanism. In other words, a user can press, depress or otherwise move the latch to allow the bridge to move in a direction opposite the second direction, thereby allowing the switching mechanism 210 to open. In some examples, such as is illustrated with reference to FIGS. 3A and 3B, the engagement portion 348*b* of the latch is engageable by the user to release the actuating mechanism and open the switching mechanism. For example, the engagement portion may comprise a trigger or be otherwise moveable to allow the latching portion 348*a* to be released or disengaged. Release or disengagement of the latching portion can allow the shaft 214 to rotate around the rotational axis, thereby allowing for opening of the switching mechanism.

In the particular example of FIGS. 3A and 3B, the latch 348 retains the four-bar linkage in the leftward position, where the bars of the linkage are perpendicular or almost perpendicular from the horizontal, thereby increasing the vertical component of the bar length. As discussed above, this increase in bar length in the vertical (i.e., along axis 106) forces the bridge 254 to move downwards (in the second direction 258). By retaining the four-bar linkage 330 in this position, the bridge is also retained in this downward position with the switching mechanism 110 closed. Engagement of the latch 348 by a user allows the four-bar linkage to pivot back towards the right of FIG. 3A (left of FIG. 3B), angling the bars with respect to the horizontal and shortening the vertical length component along axis 106 (thereby allowing the bridge 254 to move upwards and opening the switching mechanism).

The bevel and spur gear pairing illustrated in FIGS. 3A-3F can facilitate reliable actuation of the switching mechanism 210 via the shaft 214 of the actuating mechanism whilst allowing the overall actuating mechanism to be more compact by aligning the shaft 214 with the rest of the actuating mechanism and the switching mechanisms. A smaller footprint can therefore be achieved. These benefits are further increased when the switching device 208 is implemented as part of a switchgear 100*b*, where a more compact switchgear can be provided. Moreover, as a result of the smaller footprint, the manufacturing costs of the overall switchgear may be reduced (fewer materials, smaller housing), facilitating provision of a robust and cost effect switchgear. Additionally, it may not be necessary to provide extra user/operator training as the user interface (i.e., the handle 240) of is kept same as existing switchgear 110*a* products.

Figure 4:
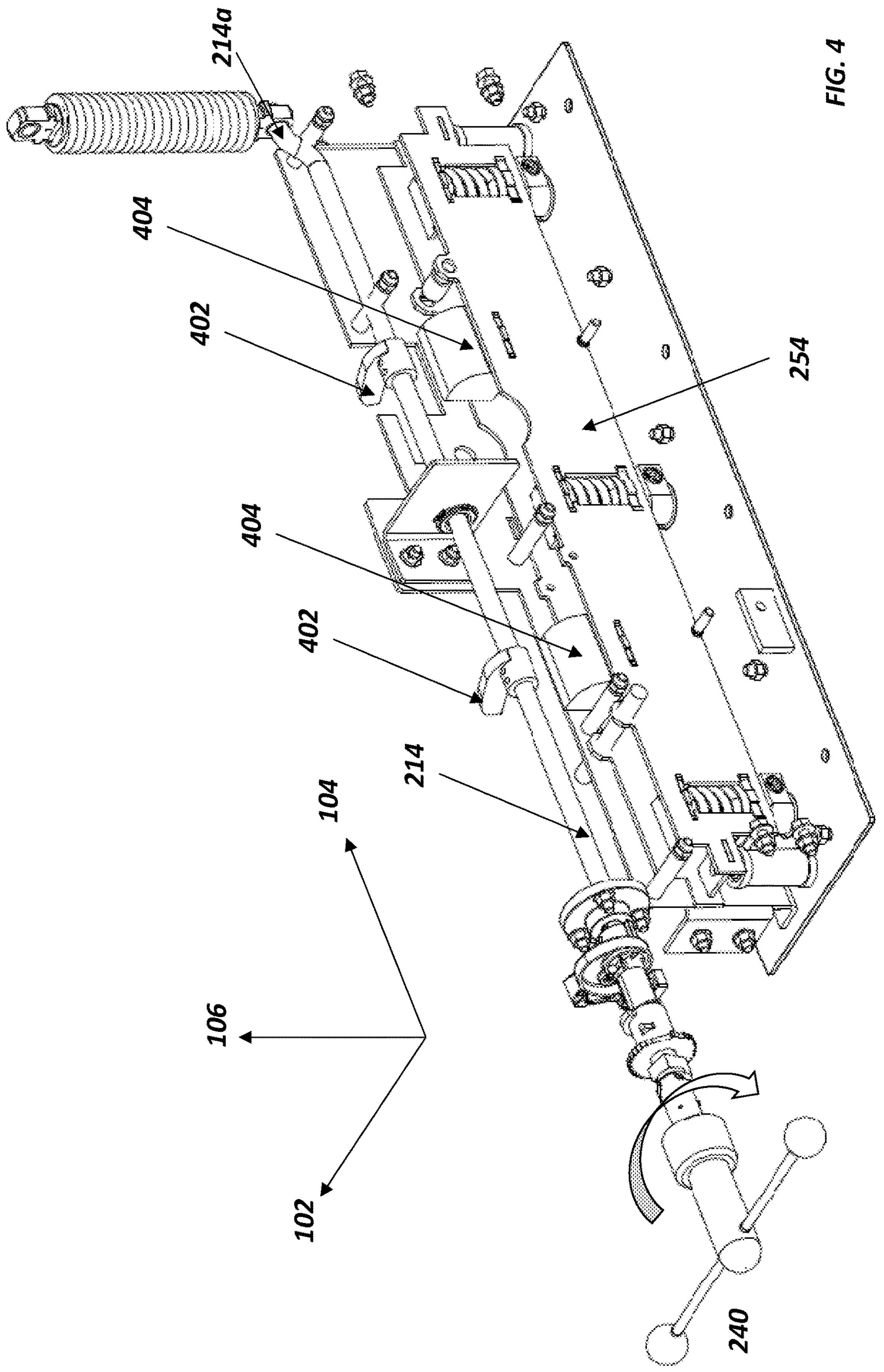
FIG. 4 shows a perspective view of a second example switching device.

With particular reference to FIG. 4, a second example implementation of the one or more force transmittal mechanisms configured to convert torque from the rotation of the shaft to a linear force acting on the bridge 254 in a second direction 258 (as discussed with reference to FIGS. 2A-2B) is now described.

In the implementation of FIG. 4, which show a perspective view of an example of the switching device 210 showing the force transmittal mechanism, the one or more force transmittal mechanisms comprise one or more cams 402 arranged on the shaft 214 and one or more corresponding cam followers 404 arranged on the bridge 254. As the shaft 214 rotates around the rotational axis, the cams 402 rotate with the shaft. The cams 402 are shaped to exert a force on the cam followers 404 as the shaft 214 rotates, which in turn forces the bridge 254 to move downwards (in the second direction 258).

Although not shown here, a latch may be provided as discussed above with respect to FIGS. 3A-3F. For example, as the cam 402 and cam follower 404 pushes the bridge in the second direction 258 and closes the switching mechanism 210, a latch can engage to retain the actuating mechanism and prevent further rotation of the shaft 214. Engagement of the latch by a user allows the shaft 214 to continue to rotate, in turn rotating the cams 402 which are shaped to (after closing of the switching mechanism) allow the bridge 254 to move upwards again. The cams 402 may be shaped to facilitate rapid movement of the bridge, and thus rapid opening of the switching mechanism, facilitating quick breaking of the circuit through the switching device 208.

Figure 5A:
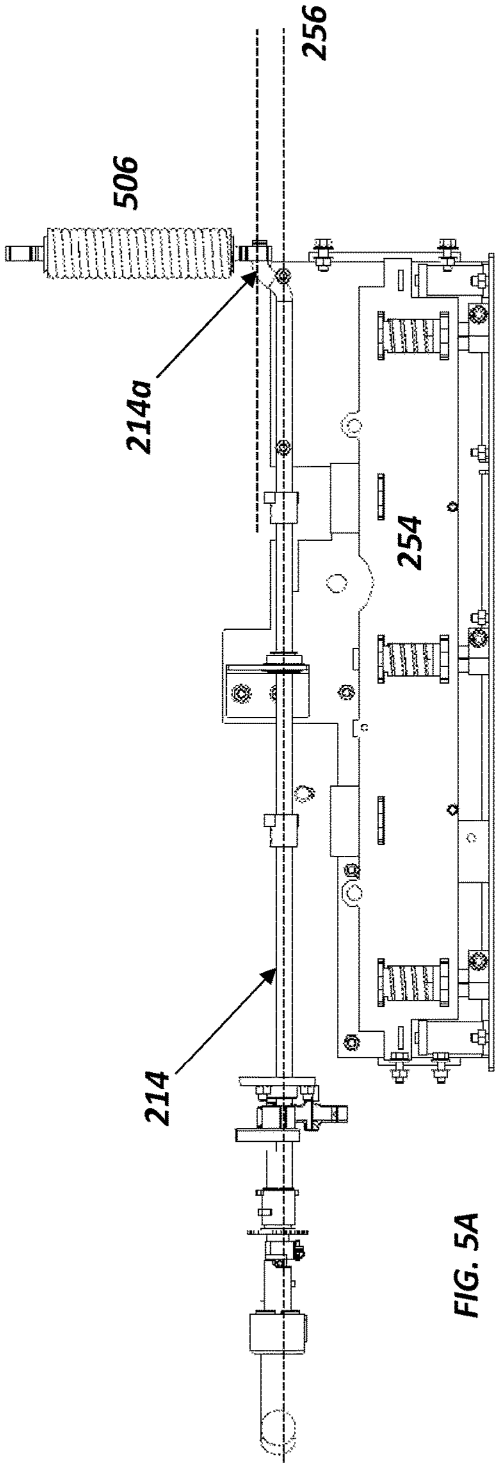
FIG. 5A shows a side view of the second example switching device of FIG. 4.
Figure 5B:
FIG. 5B is a schematic illustration of the actuating mechanism of the second example switching device.
Figure 5B:
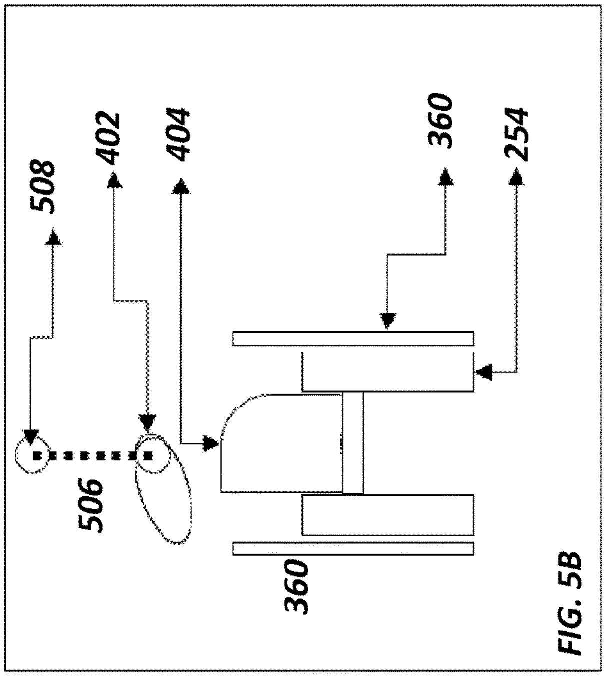

With further reference to FIGS. 5A-5B, FIG. 5A shows a perspective view of an example of the switching device 210 of FIG. 4, and FIG. 5B shows a schematic illustration of the force transmittal mechanism of this example.

In this example, the shaft 214 comprises an offset portion 214*a* which extends parallel to the rotational axis 256 of the shaft 214 but is offset from the rotational axis 256. The offset portion 214 can be joined or coupled to the rest of the shaft 214 (i.e., the main portion of the shaft which is actuated by a user through handle 240) by way of an S bend. In other examples, the offset portion 214*a* is formed from the shaft 214 by introducing or creating an S bend.

The switching device 210 further comprises a resiliently deformable member 506 coupled to the offset portion 214*a* of the shaft 214. Rotation of the shaft 214 around the rotational axis 256 in response to user input causes deformation of the resiliently deformable member 506. The resiliently deformably member 506 may be coupled to the housing 216 at the other end, or may be arranged and/or fixed in any suitable manner to facilitate deformation of the member 506 as the shaft 214 rotates. In this example, the resiliently deformable member is configured to hinge or rotate around a hinge point 508 (arranged at the end of the member 506 which is opposite coupled to the offset portion 214*a*), but any other suitable fixing or coupling point 508 may be used.

In this example, the resiliently deformable member is a tension spring. In other words, due to the offset portion 214*a* being offset from the rotational axis 256, the resiliently deformable member is pulled or extended in the second direction 258. A maximum extension is experienced by the member 506 when the shaft 214 is rotated 180 degrees from the position shown in FIG. 5A (i.e., where the rotational axis 256 extends between the coupling point 508 of the member 506 and the offset portion 214*a*. A restoring force due to deformation (i.e., extension) of the deformed resiliently deformable member 506 causes further rotation of the shaft 214 around the rotational axis. This further rotation of the shaft can be independent of the user input. In other words, the offset portion 214*a* and resiliently deformably member 506 act to provide a toggle point for the actuating mechanism, after which toggle point the closing of the switching mechanism is user independent. This mechanism is discussed in more detail with reference to FIGS. 6A-6C.

It will be understood that in other examples the member 506 may be any other suitable component. For example, a compression spring may be used, wherein the resiliently deformable member is configured such that maximum compression occurs at the position shown in FIG. 5A; the restoring force then acts to push the offset portion 214*a* away from the resiliently deformable member 506, driving the shaft 214 independent of user input. However, any other resiliently deformable member (which is resiliently deformable through form and/or function) may be used.

Figure 6A:
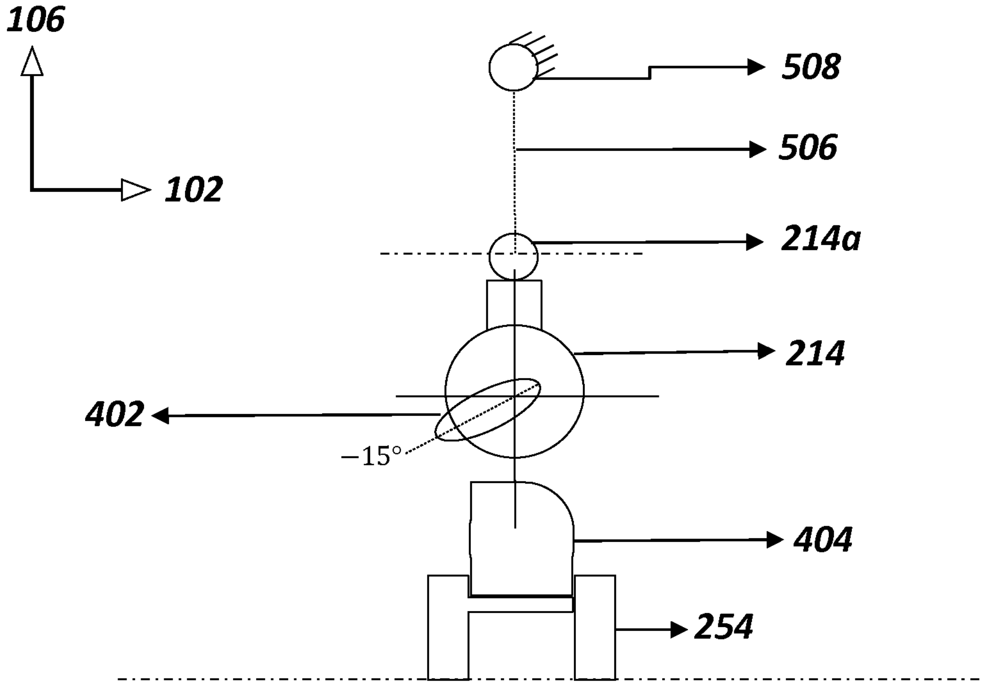
FIGS. 6A-6C are schematic illustrations of the position of the second example switching device during actuation.
Figure 6B:
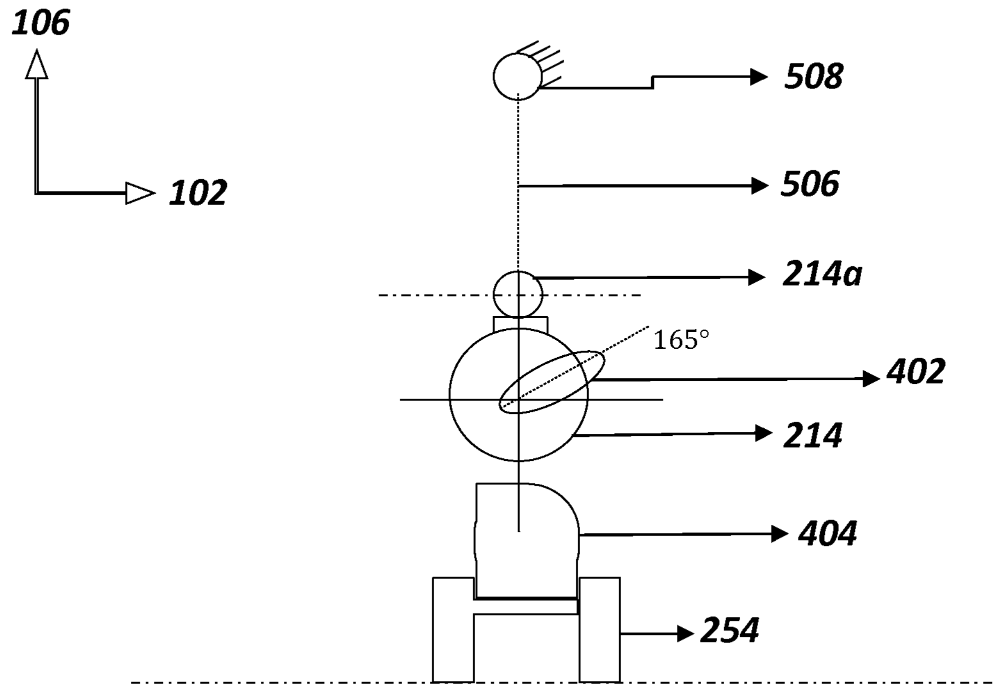
Figure 6C:
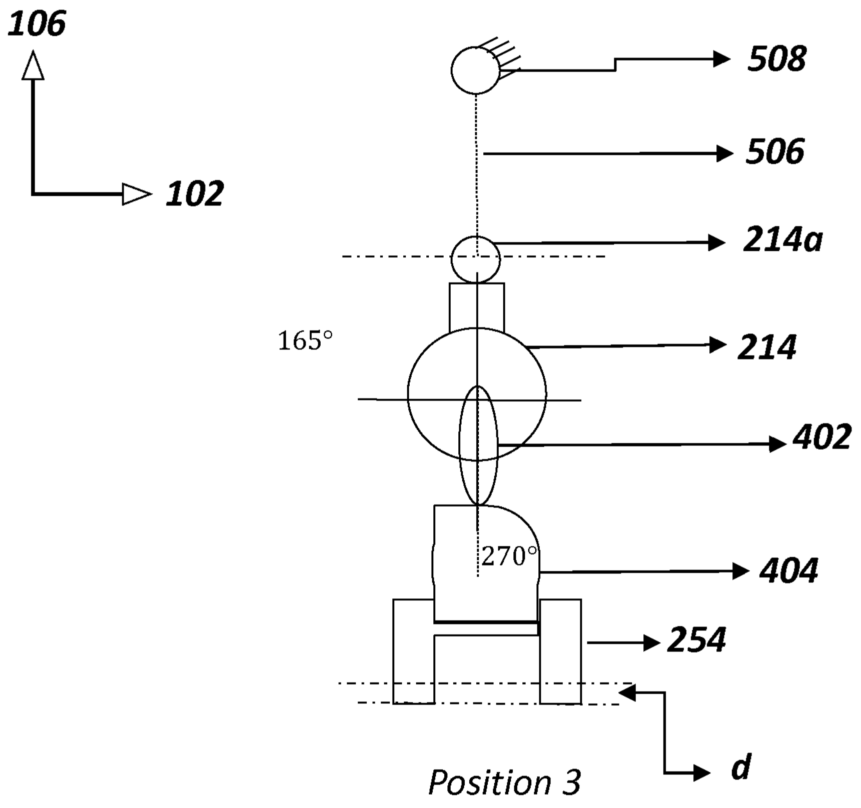

With reference to FIGS. 6A-6C, three distinct positions of the shaft 214 are shown, corresponding to different angles of rotation of the shaft 214 around the rotational axis 256. As discussed above, a user can provide an input motion to the actuating mechanism through the shaft 214. The operator uses handle 240 (or other input means) to rotate the shaft 214 around the rotational axis 256 (from 0 degrees to 180 degrees). Position 1 (as shown in FIG. 6A) is an illustrative position within this range, where the cam is illustratively orientated at 15 degrees below the horizontal. In this example, the shaft (and cam) are being rotated around the rotational axis in a clockwise direction.

At or just after 180 degrees (as shown in position 2 of FIG. 6B) the resiliently deformable member 506 (here an extension spring) is at maximum deformation. This is the toggle point-before 180 degrees of rotation, the restoring force from the extension spring 506 would cause the shaft 214 to rotate in the opposition direction (i.e., in the direction opposite to the direction of user rotation). After 180 degrees, the user can release the handle and the resultant restoring force causes the shaft 214 to continue to rotate in the same direction of rotation. In other words, the restoring force of the deformed (extended) spring 506 rotates the shaft (and cam) in the clockwise direction. The cam is now illustratively orientated at 165 degrees.

At position 3 (as shown in FIG. 6C), the cam 402—cam follower 404 pair act to convert the torque from rotation of the main shaft into movement along axis 106. In particular, the cam 402 is shaped to cause displacement or vertical motion of the bridge 254 in the second direction 258. In this example, the vertical displacement of the bridge 254 is shown by the distance d. This displacement d is sufficient to cause the switching mechanism to close. In this position, the resiliently deformable member can be undeformed, and there is no restoring force being applied to cause rotation of the shaft 214.

Where a latch is provided, the shaft 214 can be latched in this position to prevent further rotation of the shaft 214 (and thus to prevent accidental or unintended opening of the switching mechanism). Additionally or alternatively, the cam and/or cam follower may be shaped to prevent further rotation of the shaft independent of user input. For example, one or more recesses, detents or protrusions may be used to engage the cam and the cam follower, thereby requiring a threshold input torque to be applied through the shaft 214 to open the switching mechanism 210.

The cam and cam follower arrangement illustrated in FIGS. 4, 5A-5B, and 6A-6C can facilitate reliable actuation of the switching mechanism 210 via the shaft 214 of the actuating mechanism whilst allowing the overall actuating mechanism to be more compact by aligning the shaft 214 with the rest of the actuating mechanism and the switching mechanisms. A smaller footprint can therefore be achieved. These benefits are further increased when the switching device 208 is implemented as part of a switchgear 100*b*, where a more compact switchgear can be provided. Moreover, as a result of the smaller footprint, the manufacturing costs of the overall switchgear may be reduced (fewer materials, smaller housing), facilitating provision of a robust and cost effect switchgear. Additionally, it may not be necessary to provide extra user/operator training as the user interface (i.e., the handle 240) of is kept same as existing switchgear 110*a* products. Assembly time and/or costs may also be reduced by use of the cam and cam follower arrangement, since the force transmittal mechanism is less complex and requires fewer components than other mechanisms.

It should be realised that the foregoing embodiments are not to be construed as limiting and that other variations, modifications and equivalents will be evident to those skilled in the art and are intended to be encompassed by the claims unless expressly excluded by the claim language.

Moreover, the disclosure of the present application should be understood to include any novel features or any novel combination of features either explicitly or implicitly disclosed herein or in any generalisation thereof. Claims may be formulated to cover any such features and/or combination of such features derived therefrom.

The invention claimed is:

1. A switching device comprising:

a plurality of switching mechanisms configured to connect and disconnect a power supply from a load, the plurality of switching mechanisms arranged along a first axis and each comprising a fixed contact and a moveable contact; and an actuating mechanism for simultaneously actuating the plurality of switching mechanisms, the actuating mechanism comprising:

a bridge configured to move the movable contacts of the plurality of switching mechanisms;

a shaft arranged along a rotational axis parallel to the first axis, wherein the shaft is configured to rotate around the rotational axis; and one or more force transmittal mechanisms configured to convert torque from the rotation of the shaft to a linear force acting on the bridge in a second direction, wherein the second direction is perpendicular to the first axis and wherein movement of the bridge in the second direction in response to the linear force brings the moveable contacts into electrical contact with the fixed contacts to close the switching mechanisms and connect the power supply to the load.

2. The switching device of claim 1, wherein for each switching mechanism the moving contact is arranged between the shaft and the fixed contact along the second direction.

3. The switching device of claim 1, wherein the one or more force transmittal mechanisms are arranged between the shaft and the fixed contact along the second direction.

4. The switching device of claim 1, wherein the one or more force transmittal mechanisms are coupled to the shaft.

5. The switching device of claim 1, wherein each switching mechanism comprises a vacuum interrupter.

6. The switching device of claim 1, wherein the one or more force transmittal mechanisms comprise:

a secondary shaft configured to rotate around a third axis perpendicular to both the first axis and the second direction;

a four-bar linkage configured to apply the linear force to move the bridge in the second direction in response to rotation of the secondary shaft; and a coupling configured to rotate the secondary shaft in response to rotation of the shaft so as to transfer the torque from the rotation of the shaft to drive the four-bar linkage.

7. The switching device of claim 6, wherein the coupling comprises a bevel gear pair.

8. The switching device of claim 7, wherein the bevel gear pair is a 1:1 bevel gear pair.

9. The switching device of claim 7, wherein the coupling further comprises a spur gear pair, wherein the bevel gear pair and the spur gear pair are rotationally connected by a shaft extending parallel to the third axis.

10. The switching device of claim 9, wherein the spur gear pair is a 1:1 spur gear pair.

11. The switching device of claim 9, wherein the shaft and the secondary shaft overlap but are offset along the second direction.

12. The switching device of claim 1, wherein the one or more force transmittal mechanisms comprise one or more cams arranged on the shaft and one or more corresponding cam followers arranged on the bridge.

13. The switching device of claim 12, wherein the shaft comprises an offset portion which extends parallel to the rotational axis of the shaft but is offset from the rotational axis, the device further comprising:

a resiliently deformable member coupled to the offset portion of the shaft, wherein rotation of the shaft around the rotational axis in response to user input causes deformation of the resiliently deformable member, and wherein a restoring force due to deformation of the deformed resiliently deformable member causes further rotation of the shaft around the rotational axis independent of the user input.

14. The switching device of claim 13, wherein the resiliently deformable member is a tension spring.

15. The switching device of claim 1, further comprising a latch configured to retain the actuating mechanism when the switching mechanism is closed, wherein the latch is engageable by a user to release the actuating mechanism and open the switching mechanism.

16. A switchgear, comprising:

a plurality of switching devices according to claim 1, wherein each switching device comprises a plurality of poles, wherein each pole is associated with a respective switching mechanism of the switching device.

* * * * *